Figures 1, 2:
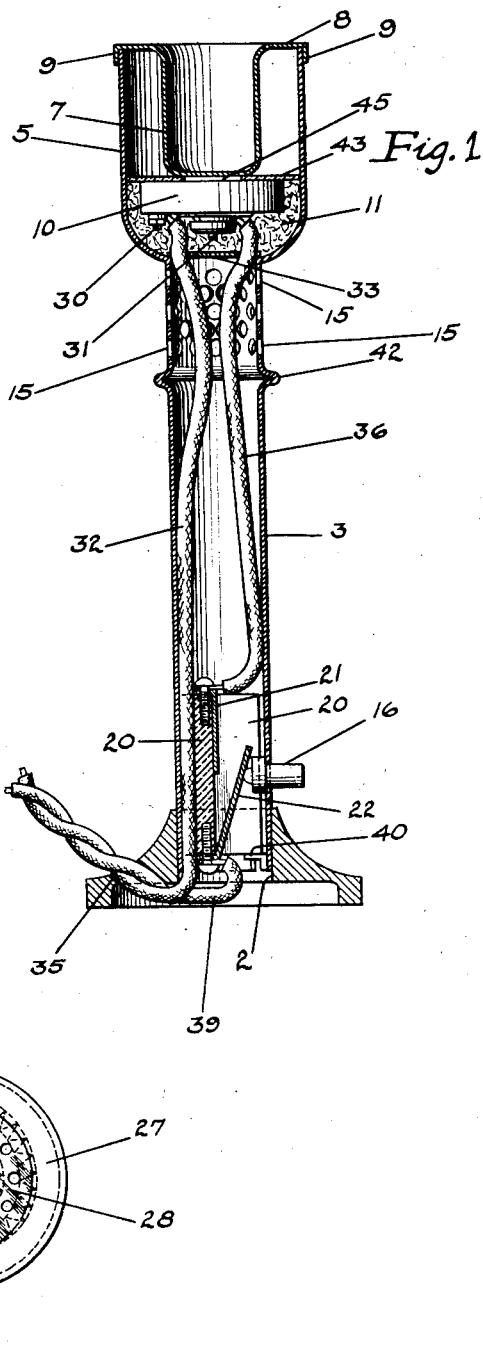

Aug. 6, 1929.  L. C. STRITE  1,723,093

VAPORIZER

Filed Sept. 13, 1928

INVENTOR
LLOYD C. STRITE
By Paul, Paul & Moore
ATTORNEYS

Patented Aug. 6, 1929.

1,723,093

UNITED STATES PATENT OFFICE.

LLOYD C. STRITE, OF MINNEAPOLIS, MINNESOTA.

VAPORIZER.

Application filed September 13, 1928. Serial No. 305,824.

This invention relates to a device for vaporizing medicaments or analogous vaporizable substances, and has among its objects; to provide a device which can be held in the hand during the vaporizing operation; to provide such a device having an electrical heating element; to provide means to substantially prevent conduction of heat from the heating element to the handle, and to arrange such means at a point between the heating element and the hand grip portion; to provide a stop for preventing movement of the hand in a manner to interfere with the operation of the conduction-preventing means; to provide a receptacle for the substance to be vaporized which is removable; to partially enclose the receptacle and arrange it in relation to the heating device so that its walls will receive the maximum amount of heat; to provide a combined tubular handle and heat chamber which is substantially formed from a single piece of metal; and to generally provide a structure which can be cheaply manufactured, is neat in appearance, and is usually efficient for the purposes in hand.

Features of the invention also include the details of construction.

Features and advantages of the invention will appear in the description of the drawings forming a part of this application, and in said drawings Figure 1 is a vertical section through the device;

Figure 2 is a plan section of the heating element.

The device comprises a pedestal 1, vertically bored as at 2 for the reception of the lower end of a tubular element 3 which constitutes a hand grip. The tubular hand grip element is surmounted by a receptacle 5 open at the upper side, and in communication with the grip portion. A feature of the construction is that the hand portion and the receptacle are formed from a single piece of tubing, or from a single piece sheet of metal. This is a valuable feature of the invention. A lid for the receptacle is formed in the manner to provide a cup for holding the material to be vaporized. This cup-shaped top may be considered as providing a hollow portion 7 which constitutes the cup and extends downwardly into the receptacle 5, and a flange 8 as a lid, having a down turned flange 9, circumscribing and tightly embracing the receptacle 5. The lid for this receptacle thus provides a cup, and the cup is of less volume than the volume of the chamber 5, so that heat, supplied by an element shortly to be described, is caused to contact the cup 7 over a maximum area. A heating element generally designated 10 is arranged within the receptacle 5 and is embedded in a suitable fireproof material 11, such as asbestos. However, although asbestos may assist in reducing heat conduction to the handle or grip portion 3, it is found insufficient to obtain this result. For this reason, and this is an important feature of the invention, means is provided to substantially prevent conduction of heat from the heating element to the handle, and in this instance this means comprises a series of openings 15 arranged at the upper part of the handle portion and between the receptacle 5 heating element 10, and the grip portion 3. This detail is claimed along with the broad idea of the use of any such means in a structure of the kind claimed herein. In this way air can be circulated through the tubing, and thus conduction is substantially prevented. A suitable switch is arranged in the bottom part of the tubular handle portion adjacent the pedestal 1. This switch may if desired be arranged at a higher level, but so as to be protected from heat by conduction through the gripping portion.

In this type of device the length of time required for heating is small, and therefore a type of switch has been employed which is manually held in closed position by the party holding the device. The button 16 of the switch is arranged so that it will be translated to switch closing position by the natural grasping movement of the hand. Thus by natural gripping action the switch is closed and held closed as long as the device is held in the hand; that is, as long as vaporization is desired, and the current is automatically interrupted when the hand is removed. This is a feature of the invention. The switch comprises an insulating base 20, an immovable terminal element 21, and a movable terminal element 22 which is of spring material and normally lies in open position as shown in Figure 1, in which position it engages the button and forces the button to its outermost position. It will be obvious that when the hand grasps the grip portion 3 the button will be pushed inwardly and the switch will be closed, The heating element comprises an insulating base 25 to which is attached a casing 26. The casing is flanged as at 27 at the top to provide an opening, and this opening is closed by a perforate piece of isinglass indicated at 28. Upon the base is mounted a heating coil 29, the terminals of which are respectively indicated at 30—31. Connected with the terminal 30 is an insulated line wire 32 which extends downwardly through a plate 33, which plate acts to hold the packing material 11 against movement into the tubular handle portion. The insulated line wire 32 extends downwardly into the base, and outwardly through an opening 35 of the base. Another line wire 36 connects with the terminal 31 and with terminal 21 of the switch, and the opposite terminal 22 of the switch is connected to wire 39, which also extends through the opening 35. A suitable stop 40 prevents downward movement of the switch in the tube 3.

Another feature of the invention is the provision of a stop to limit the upward movement of the hand toward the ventilating means. In this instance this stop is formed by crimping to provide a circumferential flange 42 horizontally arranged and lying in this instance immediately below the ventilating openings 15.

Upon the top of the heating element 10 is laid a piece of insulating material 43, in this instance a piece of isinglass which has an opening 45 lying directly beneath, and substantially of an area equal to the bottom of the cup 7. This is for the purpose of insulating the heating element from any metal portion of the device. Of course it will be understood that the heating element per se is mounted upon the insulating base 25.

The idea of having the switch button operable by the natural gripping action of the hand, when the device is being held in operating position as when inhaling, is a feature of the invention.

Another feature of the invention is the general construction which facilitates assembly of the parts. For example the button of the switch may be introduced through the opening 17, and then the switch base 20 can be inserted and the stop 40 applied. The insulating line wire 32 may be then introduced from below and passed through plate 33, and in the same manner the line wire 36 is introduced. Although sufficient slack has not been shown in the drawing to permit sufficient extension of the elements 32 and 36 to facilitate attachment to the binding posts 30—33, it will be understood that the attachment may then be made as shown at these points. The material 11 may then be introduced, either with the element 10 embedded therewith or the material may be first introduced and then the element 10 embedded. The insulating material 43 is then applied and then the cover 8. The steps of assembly may be reversed, that is the heating element first applied, and then the switch.

The construction is extremely simple, and the manufacturing assembly costs are comparatively small. The features of cheap construction and ease of assembly are valuable as parts of the invention.

I claim as my invention:

1. A device of the class described comprising a tubular element as a hand grip surmounted by a receptacle which is in communication therewith, a heating element arranged within the receptacle, a switch arranged within the tubular element, electrical connections between the switch and heating element, and a lid for the receptacle formed to provide a cup for holding the material to be vaporized, the cup being of less volume than the volume of the receptacle.

2. A device of the class described comprising a tubular element as a hand grip surmounted by a receptacle which is in communication therewith, a heating element arranged within the receptacle, a switch arranged within the tubular element, electrical connections between the switch and heating element, and means disposed intermediately of the heating element and gripping portion of the tubular element to substantially prevent conduction of heat from the heating element to the handle.

3. A device of the class described comprising a tubular element as a hand grip surmounted by a receptacle which is in communication therewith, a heating element arranged within the receptacle, a switch arranged within the tubular element, electrical connections between the switch and heating element for controlling it, and means disposed intermediately of the heating element and gripping portion of the tubular element to substantially prevent conduction of heat from the heating element to the handle, said means comprising a series of openings permitting lateral circulation of air through the tubular element.

4. A device of the class described comprising a tubular element as a hand grip surmounted by a receptacle which is in communication therewith, a heating element arranged within the receptacle, a switch arranged within the tubular element, electrical connections between the switch and heating element for controlling it, and means disposed intermediately of the heating element and gripping portion of the tubular element to substantially prevent conduction of heat from the heating element to the handle, said means comprising a series of openings in the tubular element permitting lateral circulation of air therethrough.

5. A device of the class described, comprising a tubular element, a switch arranged within the tubular element having a button adapted to be pressed to switch closing position by the natural gripping action of the hand when holding the tubular element, a receptacle surmounting the handle and communicating interiorly therewith, a heating element arranged within the receptacle, electrical connections between switch and heating element, said tubular element being perforated at a point adjacent the receptacle, to provide means to substantially prevent conduction from said heating element to the grip portion of said tubular element.

6. A device of the class described, comprising a tubular element surmounted by a receptacle which is in communication therewith, a heating element arranged within the receptatcle, a switch arranged within the tubular element, electrical connections between the switch and the heating element, means disposed intermediately of the heating element and gripping portion of the tubular element, to substantially prevent conduction of heat from one to the other, and a circumferential stop arranged upon the tubular element between said last mentioned means and the gripping portion, to prevent the hand from interfering with the proper operation of said means.

7. A device of the class described having a tubular portion as a hand grip, surmounted by a receptacle, heating means within the receptacle, a lid for said receptacle and having a cup extending toward said heating means, means carried by the grip portion and interposed between the heating means and receptacle and said grip portion, and adapted to substantially prevent conduction of heat to said grip portion.

8. A device of the class described having a tubular portion as a hand grip, surmounted by a receptacle, heating means within the receptacle, a lid for said receptacle and having a cup extending toward said heating means, means carried by the grip portion and interposed between the heating means and receptacle and said grip portion, and adapted to substantially prevent conduction of heat to said grip portion, a switch in said grip portion, and conducting elements connecting switch and heating means and passing through said conduction-preventing means.

9. A device of the class described having a tubular portion as a hand grip, surmounted by a receptacle, heating means within the receptacle, surmounted by a plate having an opening exposing the portion of the heating means, and a lid closing the top of the receptacle and having a cup extending toward and opposed to the plate opening.

10. A device of the class described having a tubular portion as a hand grip surmounted by a receptacle, heating means within the receptacle, surmounted by a plate having an opening exposing the portion of the heating means, and a lid closing the top of the receptacle and having a cup extending toward and opposed to the plate opening, the cup being of less volume than the chamber to expose the entire wall area of the cup to heating action.

11. A device of the class described having a tubular portion as a hand grip, surmounted by a receptacle, which is in communication therewith, heating means arranged within the receptacle, a partition overlying the heating means, and a lid closing the top of the receptacle and having a cup extending toward and overlying the partition.

12. A device of the class described having a tubular portion as a hand grip, surmounted by a receptacle, heating means arranged within the receptacle and a lid closing the top of the upper chamber and having a cup extending downwardly and engaging said heating means over a substantial area and being of less volume than that of the chamber to expose all walls of the cup to the heating action.

In witness whereof, I have hereunto set my hand this 4th day of September, 1928.

LLOYD C. STRITE.